United States Patent Office 2,920,508
Patented Jan. 12, 1960

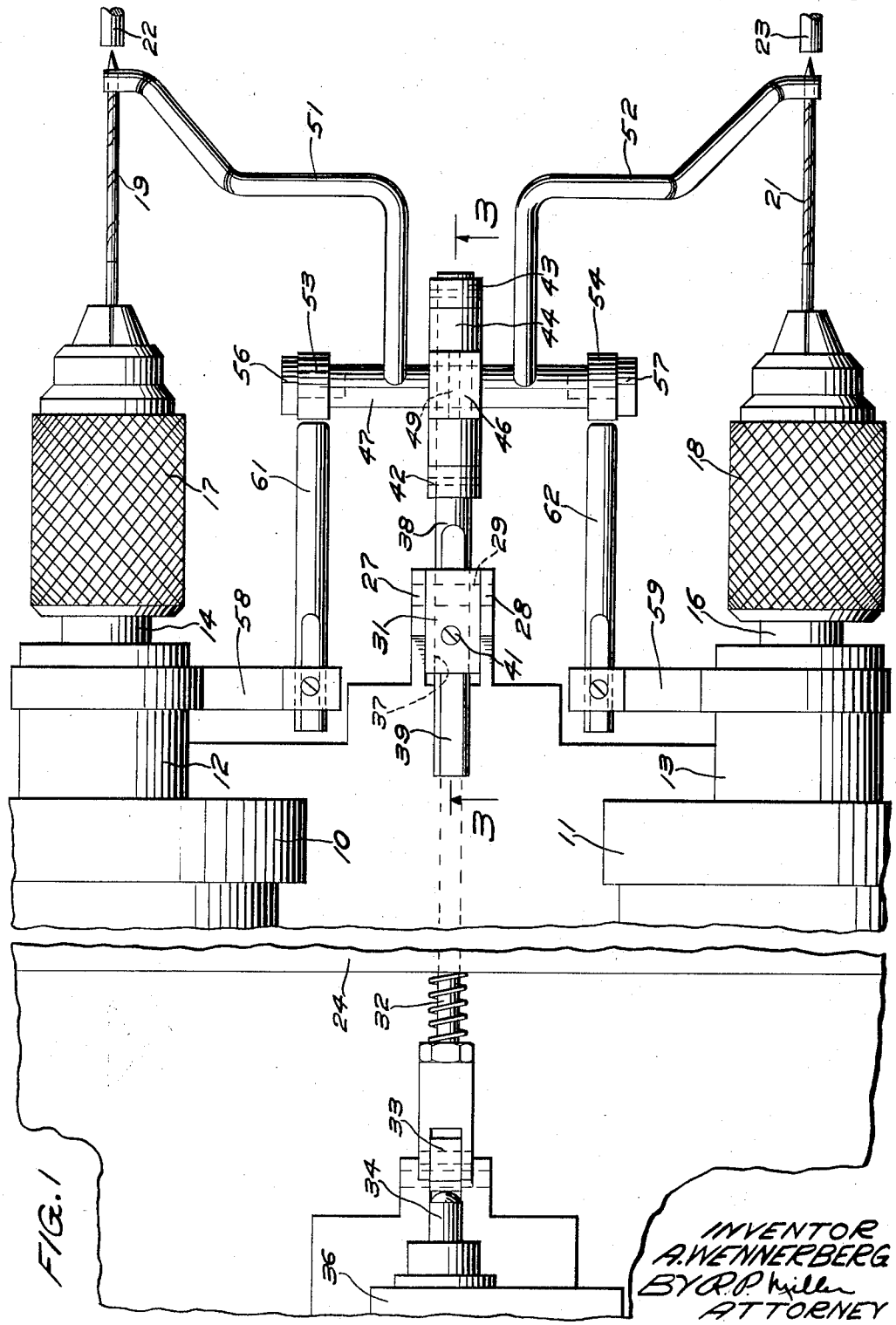

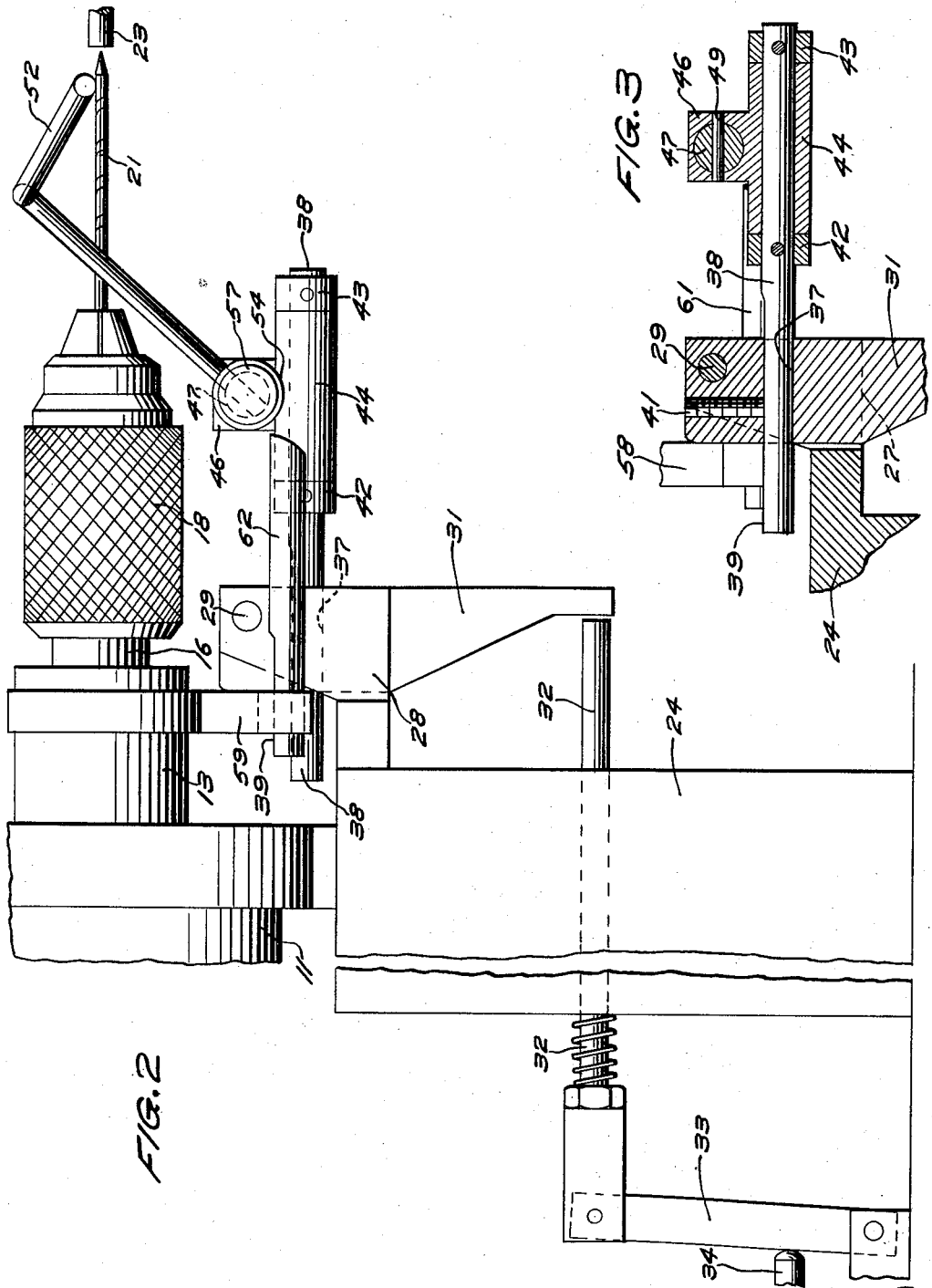

2,920,508

BROKEN DRILL DETECTOR

August Wennerberg, Three Oaks, Mich., assignor to Western Electric Company, Incorporated, New York, N.Y., a corporation of New York Application February 10, 1958, Serial No. 714,420

6 Claims. (Cl. 77—22)

This invention relates to a broken drill detector, and more particularly to a device for interrupting the cyclic operation of a plurality of tools upon ascertainment of a broken tool.

In the operation of many types of automatic cyclically operating drilling or other metal forming or fabricating machines, it is still often necessary to have an attendant present for the purpose of checking for the proper functioning of the machine components. This is particularly true with respect to checking for broken cutting or finishing tools. In automatic drilling machines the presence of a broken drill bit will not interfere with the cyclic operation of the overall machine, and as a consequence, holes that should be drilled are not so drilled or at best only partially drilled.

It is a prime object of this invention to provide safety facilities for interrupting the operation of a cyclically operating metal fabricating machine upon ascertainment of a broken cutting tool.

A further object of this invention resides in a broken drill detector for ascertaining the presence of a broken drill bit in a group of cyclically operating drill bits.

Another object of the invention is the provision of a novel tilting mechanism that periodically senses for the presence of broken tools in a cyclically operating metal cutting machine.

With these and other objects in view the present invention contemplates a multi-spindle drilling machine having a series of sensing arms in engagement with the drills. A camming arrangement attached to the drill spindles cyclically lifts the sensing arms from the drill bits during drilling operations. If a sensing arm ascertains a broken drill, a linkage is tilted and pivoted to operate a switch that functions to interrupt the overall operation of the drilling machine.

Other objects and advantages of the present invention will be apparent from the following detailed description when considered in conjunction with the accompanying drawings wherein Fig. 1 is a top plan view of a multi-spindle drilling machine having a broken drill detector in accordance with the principal features of the present invention;

Fig. 2 is a side elevational view particularly illustrating a broken drill detector and a camming arrangement for lifting the detector from the drill, and Fig. 3 is a sectional view taken along line 3—3 of Fig. 1 showing a portion of the linkage for controlling the broken drill detector.

Referring to Figs. 1 and 2, there is shown a portion of a multi-spindle horizontal drill press comprising heads 10 and 11 having mounted therein for reciprocable movement a pair of quills 12 and 13. The quills have rotatably mounted therein a pair of spindles 14 and 16 to which are attached a pair of chucks 17 and 18 for receiving cutting drills 19 and 21. A drilling machine incorporating these components is well known and is adapted to be cyclically operated so that the quills, spindles, chucks and drills are cyclically reciprocated toward and away from a pair of work pieces 22 and 23. As the components are reciprocated, the spindles, chucks and drills are rotated so that the drills will simultaneously operate upon the workpieces. Heads 10 and 11 are mounted on a frame 24 having secured thereto a bracket 26. Bracket 26 is provided with a pair of upwardly extending apertured ears 27 and 28. A stud shaft 29 extends through the apertured ears 27 and 28 and provides a pivotal support for an actuator lever 31. The lower extremity of the actuator lever 31 is positioned in alignment with a spring-biased plunger 32 that is connected to a pivotally mounted lever 33. When plunger 32 is moved toward the left to pivot the lever 33, a switch actuator 34 is operated to open a switch 36 included in the control circuit for the overall drilling machine. Obviously, the opening of this switch results in an interruption of the further cyclic operation of the machine.

Lever 31 is provided with a bore 37 (see Fig. 3) into which is fitted a rod 38 having a flat upper surface 39. A set screw 41 is mounted in a threaded aperture formed in the upper extremity of the lever 31 so as to engage the flat surface 39 and thus secure the rod 38 within the actuator 31. Pinned to the opposite extremity of the rod 38 is a pair of collars 42 and 43 that function to restrain a sleeve 44 from lateral movement along the rod 38. Sleeve 44 has welded or otherwise secured thereto a boss 46 that is provided with an aperture into which is mounted a shaft 47. A pin 49 retains the shaft against sliding movement. The opposite extremities of the shaft extending from the boss 46 are provided with apertures for the reception of a pair of sensing arms 51 and 52 that are so shaped as to extend over and engage the drills 19 and 21.

The opposite extremities of the shaft 47 are provided with rollers 53 and 54 that are retained thereon by stud bolts 56 and 57. The quills 12 and 13 are provided with a pair of strap-like brackets 58 and 59 attached to a pair of elongated lifter cams 61 and 62 that are adapted to cooperate with the rollers 53 and 54 to lift the rollers, and as a consequence, lift the shaft 47 and the sensing arms 51 and 52 from engagement with the drills 19 and 21.

In operation of the drilling machine, the drills 19 and 21 are cyclically moved toward and away from the work pieces 22 and 23. As the quills 12 and 13 move during the cyclic operation of the machine, the lifter cams 61 and 62 engage the rollers 53 and 54 to lift the shaft and sensing arms 51 and 52. The sensing arms do not engage the drills 19 and 21 during the actual drilling operation. Upon withdrawal of the quills 12 and 13, the lifter cams 61 and 62 permit the arms 51 and 52 to move into engagement with the drills 19 and 21, and if the drill 19 is broken the arm 51 will drop causing the shaft 47 to tilt to exert a pivoting force on the boss 46 that functions to turn the sleeve 44 on the rod 38. The rod 38 and the actuator element 31 are now free to pivot about the stud shaft 29. As the arm 51 pivots, the arm 52 likewise pivots away from the drill 21 to remove all support for the rod 38 and the components secured thereto. The actuator 31 thus pivots in a clockwise direction to move the plunger 32 and thus pivot the lever 33 into engagement with the switch actuator 34. The switch 36 thereupon opens to interrupt the operation of the drilling machine until such time as the broken drill 19 is replaced and the arms 51 and 52 are again supported by the drills 19 and 21. If the drill 21 breaks, the sensing arm 52 drops to again actuate the various components to open the switch 36 to interrupt further operation of the drilling machine.

It is to be understood that the above-described arrangement of apparatus and construction of elemental parts are simply illustrative of an application of the principles of the invention and many other modifications may be made without departing from the invention.

What is claimed is:

1. A broken tool detector for a machine having a pair of cutting tools, comprising means for interrupting operation of the machine, a pivotally mounted actuator for operating the interrupting means, a rod extending laterally from the pivot axis of said actuator, a sleeve rotatably mounted on and about said rod, said rod and sleeve tending to pivot said actuator to operate said interrupting means, and a pair of sensing arms attached to the sleeve and engaging said tools for holding the sleeve from rotating and the rod in an elevated position to keep said actuator from pivoting to operate the interrupting means.

2. A broken tool detector for a machine having a pair of cutting tools, comprising means for controlling the operation of the machine, a pivotally mounted actuator for interrupting the control means, a rod secured to the actuator extending laterally from the pivot axis of said actuator, a sleeve rotatably mounted on and about said rod, said rod and sleeve tending to move the actuator to interrupt the control means, and a pair of sensing arms attached to opposite sides of the sleeve, said sensing arms having portions engaging the tools to prevent tilting of the arms to rotate the sleeve whereby the rod and sleeve are held in an elevated position and the actuator is held from interrupting the control means.

3. A broken tool detector for a machine having a pair of reciprocating cutting tools, comprising means for interrupting operation of the cutting tools, a movably mounted actuator positioned between the tools for operating the interrupting means, a rod secured to the actuator extending laterally from the pivot axis of the actuator, a sleeve rotatably mounted on and about the rod, said rod and sleeve exerting a force tending to move the actuator to operate the interrupting means, a pair of sensing arms attached to and extending from opposite sides of the sleeve for engaging the tools to prevent rotation of the sleeve and pivoting of the rod to operate the actuator, and a pair of lifters attached to said tools for engaging and lifting the sensing arms while said tools are reciprocating whereby the rod and sleeve are lifted to move the actuator away form the interrupting means.

4. A broken tool detector for a machine having a pair of cutting tools, comprising a switch mechanism for controlling the operation of the machine, a pivotally mounted switch actuator, a rod extending through the actuator perpendicular to the pivot axis of the actuator, a sleeve rotatably mounted on and about the rod, said sleeve and rod acting to pivot the actuator to operate the switch mechanism and a pair of sensing arms radially attached to the sleeve engaging respective tools for holding the sleeve and rod from moving the actuator to operate the switch mechanism, whereby when either one of the tools is broken the sleeve will rotate and the rod will pivot about the actuator pivot point to pivot the actuator into engagement with the switch mechanism.

5. A detector for broken tools, comprising a pair of members engaging respective tools, a switch mechanism, a pivotally mounted actuator for said switch, a rod connected to said actuator extending laterally therethrough from the pivot axis of the actuator, said rod and sleeve exerting a force to pivot said actuator to operate said switch mechanism, a sleeve rotatably mounted on the rod, and means interconnecting the sleeve and said tool engaging members for holding the rod and sleeve in an elevated position to hold said actuator from operating said switch mechanism, whereby when either one of the tools is broken the tool engaging members will rotate the sleeve and pivot the rod to move the switch actuator about the actuator pivot axis to actuate the switch mechanism.

6. A broken drill detector for a machine having a pair of cyclically reciprocating drills, comprising a switch for interrupting the operation of the machine, a pivotally mounted actuator positioned between said drills for operating the interrupting means, a rod secured to the actuator extending laterally from the pivot axis of the actuator for imparting a pivoting force to said actuator, a sleeve rotatably mounted on and about the rod for exerting a force on said rod to pivot the actuator, a shaft attached to and laterally extending from opposite sides of the sleeve, a pair of sensing arms secured to opposite extending portions of the shaft for engaging the tools and holding the sleeve from rotation, said sensing arms holding the rod and sleeve in an elevated position to prevent the actuator from pivoting and operating the interrupting means, a pair of rollers secured to the opposite ends of the shaft, and a pair of lifters attached to the drills for cyclically engaging and lifting the rollers during each reciprocation of the drills whereby the sensing arms are cyclically moved from engagement with the drills and the rod and sleeve are moved to pivot the actuator away from the switch, said shaft being effective to rotate the sleeve when a broken drill is ascertained by a sensing arm whereupon the sleeve rotates and the rod pivots the actuator to operate the switch.

References Cited in the file of this patent

UNITED STATES PATENTS

| | | |
|---|---|---|
| 1,902,762 | Conlon | Mar. 21, 1933 |
| 1,935,979 | Hubbard | Nov. 21, 1933 |
| 1,981,147 | Moller | Nov. 20, 1934 |

UNITED STATES PATENT OFFICE
CERTIFICATE OF CORRECTION

Patent No. 2,920,508                      January 12, 1960

August Wennerberg

It is hereby certified that error appears in the printed specification of the above numbered patent requiring correction and that the said Letters Patent should read as corrected below.

Column 3, line 43, for "form" read -- from --; column 4, lines 10 to 13, strike out "said rod and sleeve exerting a force to pivot said actuator to operate said switch mechanism," and insert the same after "rod," in line 14, same column.

Signed and sealed this 28th day of June 1960.

(SEAL)
Attest:
KARL H. AXLINE
Attesting Officer

ROBERT C. WATSON
Commissioner of Patents